E. L. Kurtz,
Fly Net.
N° 17,934. Patented Aug. 4, 1857.
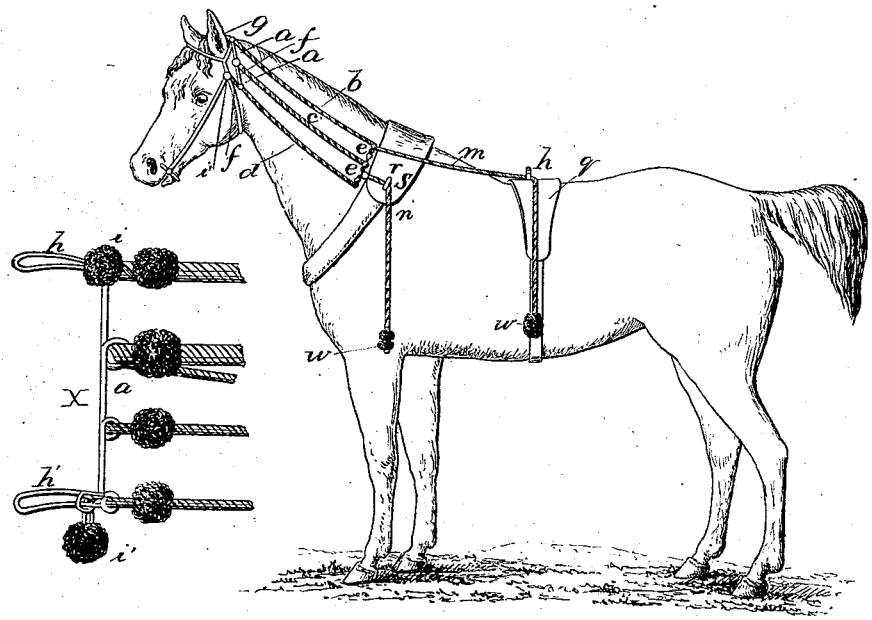
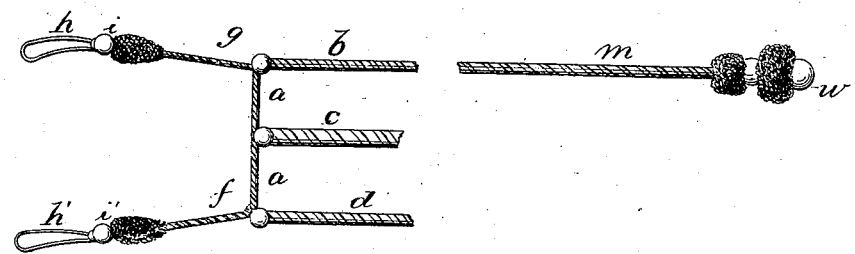

UNITED STATES PATENT OFFICE.

ERNST L. KURTZ, OF NEW YORK, N. Y.

DEVICE FOR PROTECTING THE NECKS OF HORSES FROM FLIES.

Specification of Letters Patent No. 17,934, dated August 4, 1857.

*To all whom it may concern:*

Be it known that I, E. L. KURTZ, of the city and county of New York and State of New York, have invented a new and useful Device for Protecting the Necks of Horses from Flies; and I do hereby declare that the following is a full, clear, and exact description of the construction and operation of the same, reference being had to the annexed drawing, which represents a horse with one of my improved protectors upon his neck, showing the manner of using the same.

The improved device which forms the subject of this specification is designed to be used on the side of the neck unprotected by the mane. It is constructed as follows: To a wire stretcher $a$ is attached three cords $b$, $c$, $d$, running to another stretcher $e$. The first stretcher $a$ has two arms $f$ and $g$, on the extremities of which are loops $h$ $h'$ and buttons $i$ $i'$, shown in large detached view. The first loop $h$ is fastened upon the head of the bridle between the ears of the horse, and the latter loop $h'$ is fastened upon the cheek piece of the bridle, as shown in the drawing. From the second stretcher $e$ run two cords $m$ and $n$. The former from the top of the stretcher, and the latter from near the middle thereof. Cord $m$ runs through one of the rings $p$ on the saddle $q$, and cord $n$ passes through one of the rings $r$, on the hames, through which the rein passes. At the extremity of each of the cords $m$ and $n$ is a weight $w$, whose action is to keep the protector properly stretched upon the animal's neck; while at the same time they will rise and fall with every movement of the horse's head, and thus prevent him from suffering inconvenience from the stretching of the cords $b$ $c$ $d$ along his neck.

Instead of the wire arms $f$ $g$, the loops $h$ $h'$ may be placed close to stretcher $a$, as shown in detached view X. The protector will be fastened to the bridle in the same manner as above described.

There may be any desired number of cords connecting the stretchers $a$ and $e$; and these may be ornamented to suit the fancy of the manufacturer, with fringe, hanging balls or in any way that may be desired.

I do not confine myself to the exact design herein described and shown in the drawing as the protector is susceptible of various modifications preserving the same general construction.

What I claim and desire to secure by Letters Patent is—

The stretchers $a$ and $e$ in combination with the connecting cords operating substantially as set forth as a fly protector; also the weighted cords $m$ and $n$ connected therewith for keeping the protector stretched and at the same time permitting the free movement of the animal's head.

In testimony whereof, I have hereunto signed my name before two subscribing witnesses.

ERNST L. KURTZ.

Witnesses:
GEO. PATTEN,
JOHN S. HOLLINGSHEAD.